(12) United States Patent
Ikeda (10) Patent No.: US 9,063,502 B2
(45) Date of Patent: Jun. 23, 2015

(54) IMAGE FORMING APPARATUS

(71) Applicant: FUJI XEROX CO., LTD., Tokyo (JP)

(72) Inventor: Masashi Ikeda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 101 days.

(21) Appl. No.: 13/675,405

(22) Filed: Nov. 13, 2012

(65) Prior Publication Data

US 2013/0287432 A1    Oct. 31, 2013

(30) Foreign Application Priority Data

Apr. 27, 2012   (JP) ................................. 2012-103137

(51) Int. Cl.
    *G03G 15/00*    (2006.01)
    *G03G 21/16*    (2006.01)
(52) U.S. Cl.
    CPC .......... *G03G 15/605* (2013.01); *G03G 21/1633* (2013.01); *G03G 21/1628* (2013.01); *G03G 21/1623* (2013.01); *G03G 21/1619* (2013.01)
(58) Field of Classification Search
    CPC .......... G03G 21/1619; G03G 21/1623; G03G 21/1628; G03G 21/1633; G03G 15/605
    USPC .......................................... 399/107, 110, 125
    See application file for complete search history.

(56) References Cited

U.S. PATENT DOCUMENTS

2006/0187291 A1* 8/2006 Asanuma ...................... 347/104
2012/0099132 A1* 4/2012 Kurokawa .................... 358/1.13
2013/0330100 A1* 12/2013 Funayama et al. ............ 399/107

FOREIGN PATENT DOCUMENTS

| JP | A-5-323695 | 12/1993 |
| JP | A-9-212064 | 8/1997 |
| JP | A-2009-116357 | 5/2009 |

* cited by examiner

*Primary Examiner* — David Gray
*Assistant Examiner* — Michael Harrison
(74) *Attorney, Agent, or Firm* — Oliff PLC (57) ABSTRACT

Disclosed is an image forming apparatus including an image forming unit that forms an image on a recording medium, an image reading unit that is provided above the image forming unit so as to read an image of a document, a frame that accommodates the image forming unit therein, including a pair of front and rear planar members disposed so as to face each other and a beam portion that connects the pair of planar members and supports upward the image reading unit, and a cover that covers at least a portion of the frame, provided with an opening portion of which an upper edge portion is supported by the beam portion.

11 Claims, 10 Drawing Sheets

IMAGE FORMING APPARATUS

CROSS-REFERENCE TO RELATED APPLICATIONS

This application is based on and claims priority under 35 USC 119 from Japanese Patent Application No. 2012-103137 filed Apr. 27, 2012.

BACKGROUND (i) Technical Field
The invention relates to an image forming apparatus.
(ii) Related Art
In the related art, various configurations for lifting an image forming apparatus such as a copying machine or a printer have been proposed.

SUMMARY

According to an aspect of the invention, there is provided an image forming apparatus including: an image forming unit that forms an image on a recording medium; an image reading unit that is provided above the image forming unit so as to read an image of a document; a frame that accommodates the image forming unit therein, including a pair of front and rear planar members disposed so as to face each other and a beam portion that connects the pair of planar members and supports upward the image reading unit; and a cover that covers at least a portion of the frame, provided with an opening portion of which an upper edge portion is supported by the beam portion.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described with reference to the drawings.

(1) First Exemplary Embodiment

Figure 1:
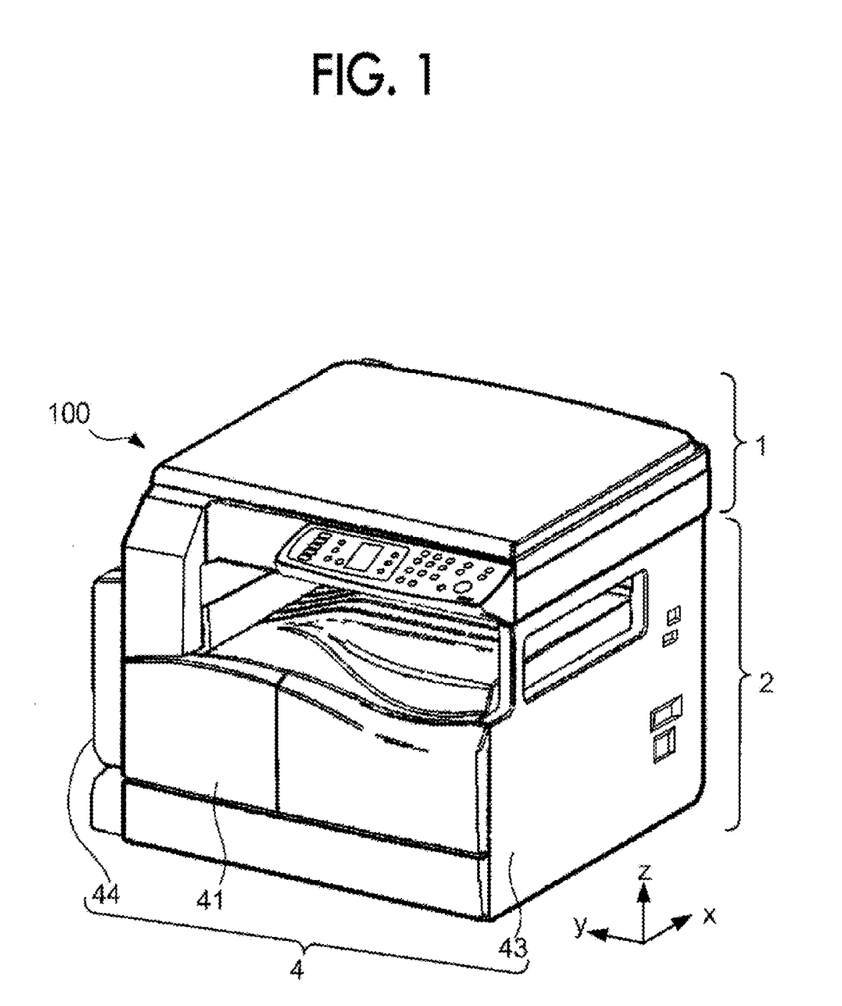
FIG. 1 is a perspective view of an image forming apparatus according to a first exemplary embodiment.

FIG. 1 is a perspective view of an image forming apparatus 100 according to a first exemplary embodiment of the invention. The image forming apparatus 100 is a copying machine, for example. As illustrated in FIG. 1, the image forming apparatus 100 includes an image reading unit 1 and an image forming unit 2. In the following description, a distant direction of a depth direction when the image forming apparatus 100 is seen from the front will be referred to as a positive x-direction, and a close direction will be referred to as a negative x-direction. Moreover, a left direction of the horizontal direction will be referred to as a positive y-direction, and a right direction will be referred to as a negative y-direction. Further, an upward direction of the height direction will be referred to as a positive z-direction, and a downward direction will be referred to as a negative z-direction. Furthermore, a coordinate symbol in which two crossing lines are included in an empty circle represents an arrow that advances from the front side of the drawing sheet to the rear side.

The image reading unit 1 is a device that optically reads an image of a document placed on a platen 11 described later. The image forming unit 2 is a device that forms an image on a recording medium based on image data output from a controller 16 described later. The image reading unit 1 is disposed above the image forming unit 2. Here, the recording medium is a recording sheet or a plastic sheet such as an Overhead Projector (OHP) sheet, for example.

Figure 2:
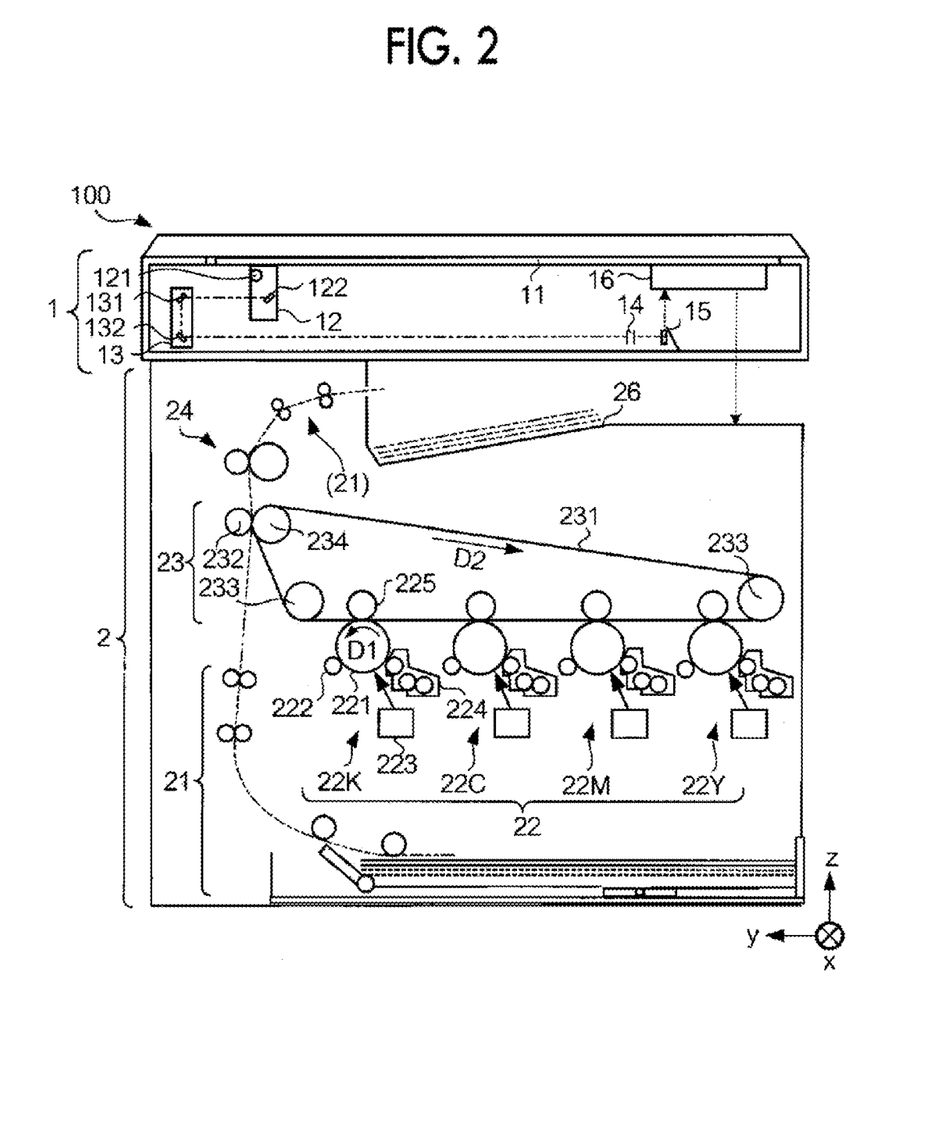
FIG. 2 is a diagram illustrating an image reading unit and an image forming unit.

FIG. 2 is a diagram illustrating the configuration of the image reading unit 1 and the image forming unit 2. As illustrated in the figure, the image reading unit 1 includes the platen 11, a full-rate carriage 12, a half-rate carriage 13, an imaging lens 14, and a Charge Coupled Device (CCD) image sensor 15. Moreover, the image reading unit 1 includes the controller 16 that controls the image reading unit 1 and the image forming unit 2.

The platen 11 is a member formed of a material such as glass that transmits light. The full-rate carriage 12 includes an illumination lamp 121 that emits light onto a document through the platen 11 and a first mirror 122 that reflects reflection light from the document toward the half-rate carriage 13. Here, the document is a medium capable of recording an image on a surface thereof, and for example, is a paper, a sheet-shaped resin, or the like. The half-rate carriage 13 includes a second mirror 131 and a third mirror 132 that reflect light reflected by the first mirror 122 toward the imaging lens 14. The imaging lens 14 images the light reflected by the third mirror 132 onto the CCD image sensor 15. The CCD image sensor 15 photoelectrically converts an optical image formed by the imaging lens 14. An image signal generated as a result of the photoelectric conversion is output to the controller 16, and image data is generated in the controller 16.

The controller 16 includes a Central Processing Unit (CPU), a Read Only Memory (ROM), and a Random Access Memory (RAM). The CPU reads a program stored in the ROM into the RAM, executes the program, and controls each portion of the image reading unit 1 and the image forming unit 2. The controller 16 outputs the image data to the image forming unit 2 to allow the image forming unit 2 to execute image formation based on the image data.

On the other hand, the image forming unit 2 includes a transporting unit 21, developing units 22Y, 22M, 22C, and 22K, a transferring unit 23, and a fixing device 24. The transporting unit 21 includes plural transporting rollers for transporting a recording medium. The transporting unit 21 takes out a recording medium from a container that stores the recording media and transports the recording medium to the transferring unit 23 with the aid of the plural transporting rollers. Moreover, the transporting unit 21 transports the recording medium having passed through the transferring unit 23 and the fixing device 24 onto a document discharge surface 26 formed on an upper surface of the image forming unit 2. The document discharge surface 26 may be a surface vertical to the direction of gravitational force and may be an inclined surface.

The developing units 22Y, 22M, 22C, and 22K are devices that form toner images of respective colors. The symbols "Y", "M", "C", and "K" of the developing units 22Y, 22M, 22C, and 22K represent the toner colors of yellow, magenta, cyan, and black, respectively, and the respective devices form toner images of yellow, magenta, cyan, and black, respectively. Since the developing units 22Y, 22M, 22C, and 22K have the same configuration although the respective units handle toner of different colors, in the following description, the units will be collectively referred to as a "developing unit 22" when there is no particular need to distinguish the respective units.

As illustrated in FIG. 2, the developing unit 22 includes a photoreceptor drum 221, a charger 222, an exposure device 223, a developer unit 224, and a primary transfer roller 225.

The photoreceptor drum 221 is a member in which a photoconductive film is stacked on an outer circumferential surface thereof and is rotated in the direction indicated by arrow D1 of FIG. 2 by a driving unit (not illustrated). The charger 222 charges the surface of the photoreceptor drum 221. The exposure device 223 emits a laser beam corresponding to the image data output from the controller 16 to the photoreceptor drum 221 charged by the charger 222 to form an electrostatic latent image. The developer unit 224 stores a two-component developer including toner of any one of the colors Y, M, C, and K and magnetic carriers such as ferrite powder, attaches toner to the electrostatic latent image formed on the photoreceptor drum 221 to form a toner image. The primary transfer roller 225 is disposed so as to face the photoreceptor drum 221 with an intermediate transfer belt 231 described later interposed and generates a predetermined electric potential difference to transfer the toner image on the photoreceptor drum 221 to the intermediate transfer belt 231.

As illustrated in FIG. 2, the transferring unit 23 includes the intermediate transfer belt 231, a secondary transfer roller 232, a belt conveying roller 233, and a backup roller 234.

The intermediate transfer belt 231 is an endless belt-shaped member and is extended across the belt conveying roller 233 and the backup roller 234. The intermediate transfer belt 231 is rotated in the direction indicated by arrow D2 of FIG. 2 by the belt conveying roller 233 or the backup roller 234. The secondary transfer roller 232 is disposed so as to face the backup roller 234 with the intermediate transfer belt 231 interposed and generates a predetermined electric potential difference to transfer the toner image on the intermediate transfer belt 231 to the recording medium transported by the transporting unit 21.

The fixing device 24 includes a fixing roller and a pressure roller. The fixing device 24 executes a fixing treatment of applying heat and pressure to the recording medium to which the toner image is transferred to fix the toner image onto the recording medium.

Figure 3:
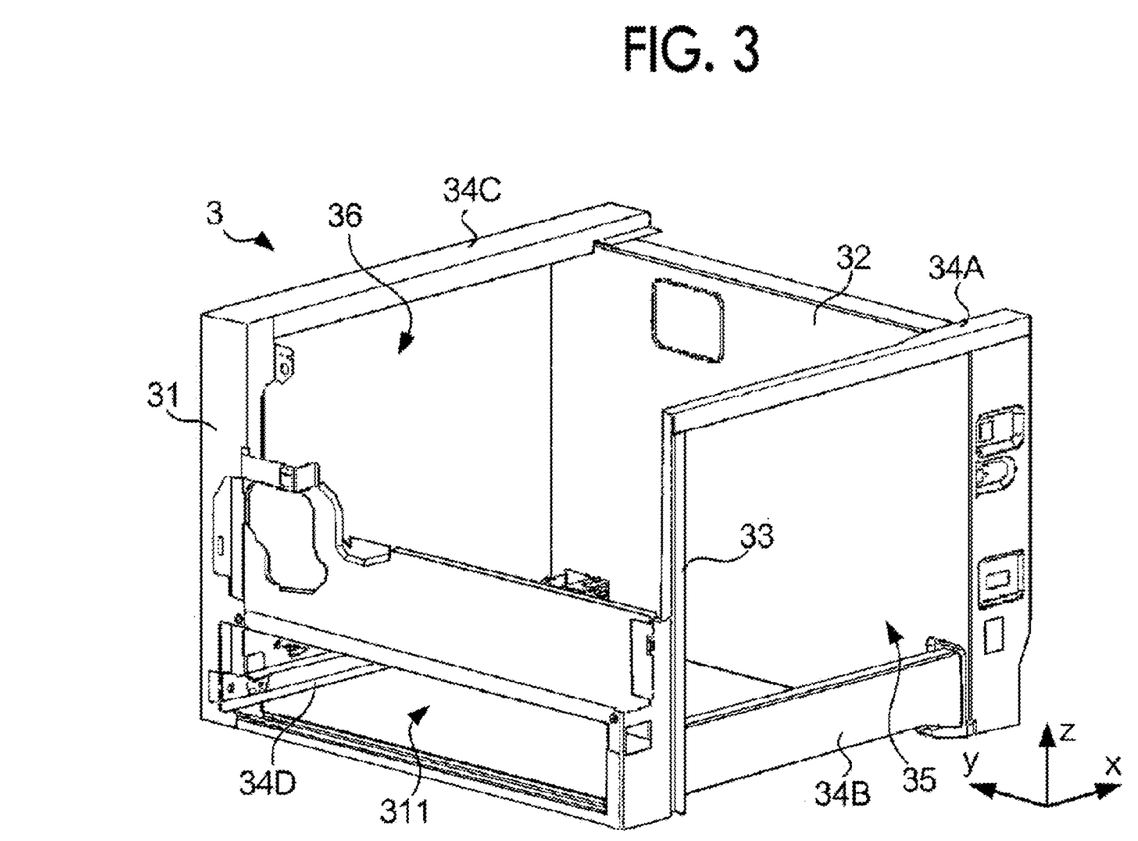
FIG. 3 is a perspective view of a frame that forms a space in which the image forming unit is accommodated.
Figure 4:
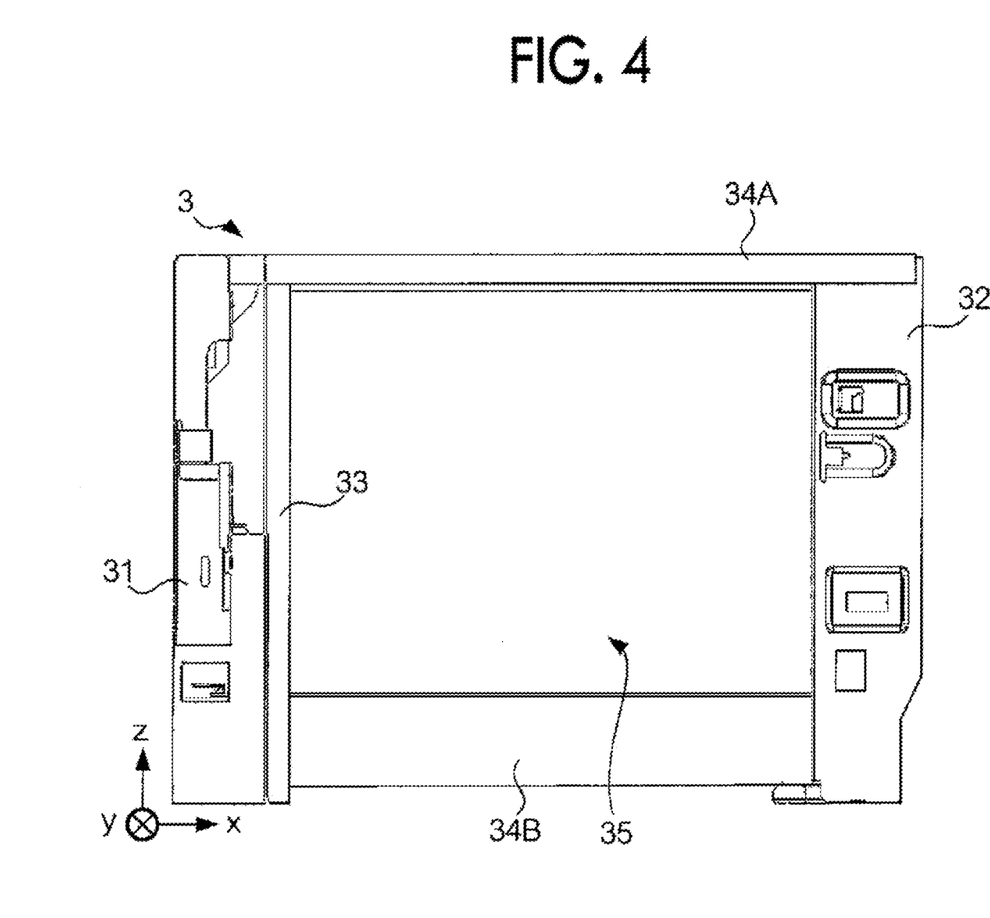
FIG. 4 is a right side view of the frame.

FIG. 3 is a perspective view of a frame 3 that forms a space in which the image forming unit 2 is accommodated. FIG. 4 is a right side view of the frame 3 (seen from the positive y-direction). The frame 3 is a metal member that forms the structure of the image forming unit 2 and fixes constituent components of the image forming unit 2. Plural holes for fixing the constituent components of the image forming unit 2 are formed in the frame 3. As illustrated in FIGS. 3 and 4, the frame 3 includes a front frame 31, a rear frame 32, a columnar support 33, and four beam portions 34A, 34B, 34C, and 34D.

The front frame 31 is an L-shaped planar member and is disposed so as to cover the front surface (a negative x-side surface) of the image forming unit 2. The front frame 31 is provided with a rectangular opening portion 311 through which a container storing recording media is taken in and out. The rear frame 32 is a rectangular planar member and is disposed so as to cover the rear surface (a positive x-side surface) of the image forming unit 2. That is, the front frame 31 and the rear frame 32 are a pair of planar front and rear members disposed so as to face each other.

The columnar support 33 is a square pillar member that is formed by bending a planar member, for example. The columnar support 33 is fixed to an end portion of the rear surface of the front frame 31 by screwing, for example, so as to extend, vertically to the longitudinal direction of the opening portion 311.

The beam portions 34A, 34B, 34C, and 34D are square pillar members that are formed by bending a planar member, for example. The beam portion 34A is extended from the rear frame 32 to the apex portion of the columnar support 33 and is supported upward by the columnar support 33. The beam portions 34B, 34C, and 34D are extended from the rear frame 32 to the front frame 31. The beam portions 34A and 34B are disposed so as to cover the right side surface (a negative y-side surface) of the image forming unit 2, and the beam portions 34C and 34D are disposed so as to cover the left side surface (a positive y-side surface) of the image forming unit 2. The beam portion 34A is fixed to the rear frame 32 and the columnar support 33 by screwing, for example. The beam portions 34B, 34C, and 34D are fixed to the front frame 31 and the rear frame 32 by screwing, for example. That, is, the beam portions 34A, 34B, 34C, and 34D connect the front frame 31 and the rear frame 32.

The beam portions 34A and 34B form an opening portion 35 together with the front frame 31, the rear frame 32, and the columnar support 33. The beam portions 34C and 34D form an opening portion 36 together with the front frame 31 and the rear frame 32. The beam portions 34A and 34C support upward the image reading unit 1 disposed above the image forming unit 2.

As illustrated in FIG. 1 described above, the above-described frame 3 is covered by a cover 4 made from a resin. The cover 4 includes a front cover 41, a rear cover 42 (see FIG. 5), a right side cover 43, and a left side cover 44.

Figure 5:
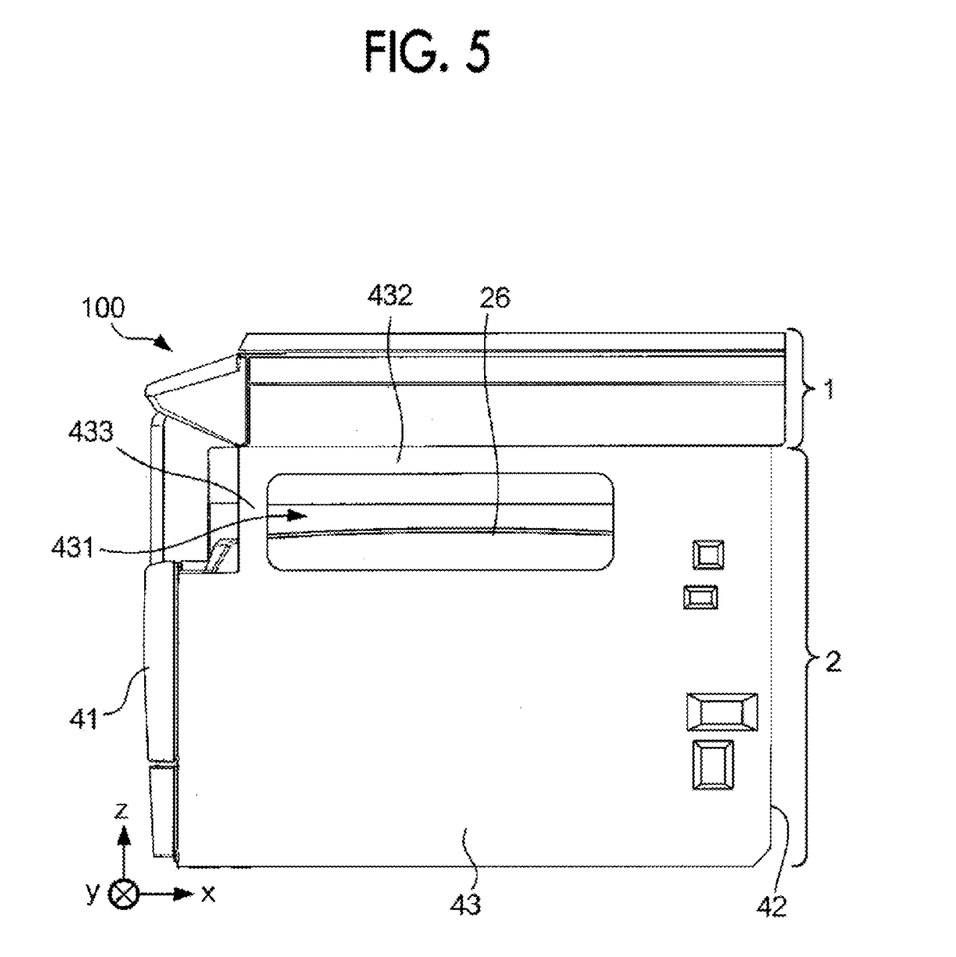
FIG. 5 is a right side view of the image forming apparatus.

The front cover 41 is an L-shaped planar member and is disposed so as to cover the front frame 31 (excluding the opening portion 311). The rear cover 42 is a rectangular planar member and is disposed so as to cover the rear frame 32. The right side cover 43 is a rectangular planar member and is disposed so as to cover the right side surface (and the columnar support 33 and the beam portions 34A and 34B) of the image forming unit 2. The left side cover 44 is a rectangular planar member and is disposed so as to cover the left side surface (and the beam portions 34C and 34D) of the image forming unit 2. The respective covers are subjected to processing for raising the edges thereof. Moreover, the respective covers are fixed to the frame 3 by screwing, for example.

FIG. 5 is a right side view of the image forming apparatus 100 (seen from the positive y-direction). As illustrated in the figure, the right side cover 43 is provided with a rounded rectangular opening portion 431 in an upper portion thereof. The opening portion 431 is disposed so as to overlap the opening portion 35 that is formed by the beam portions 34A and 33B, the front frame 31, and the rear frame 32. That is, the right side cover 43 is disposed so that the right side surface of the image forming unit 2 is visible through the opening portion 431. The opening portion 431 connects a space surrounded by the image forming unit 2 and the image reading unit 1 and an external space of the image forming apparatus 100. An upper edge portion 432 of the opening portion 431 is disposed at a position of the image forming unit 2 on an upper side (a position closer to the image reading unit 1) than the document discharge surface 26. Here, the upper edge portion 432 is a side closest to the image reading unit 1 among the four sides that form the opening portion 431 when the opening portion 431 has a rectangular shape.

Figure 6:
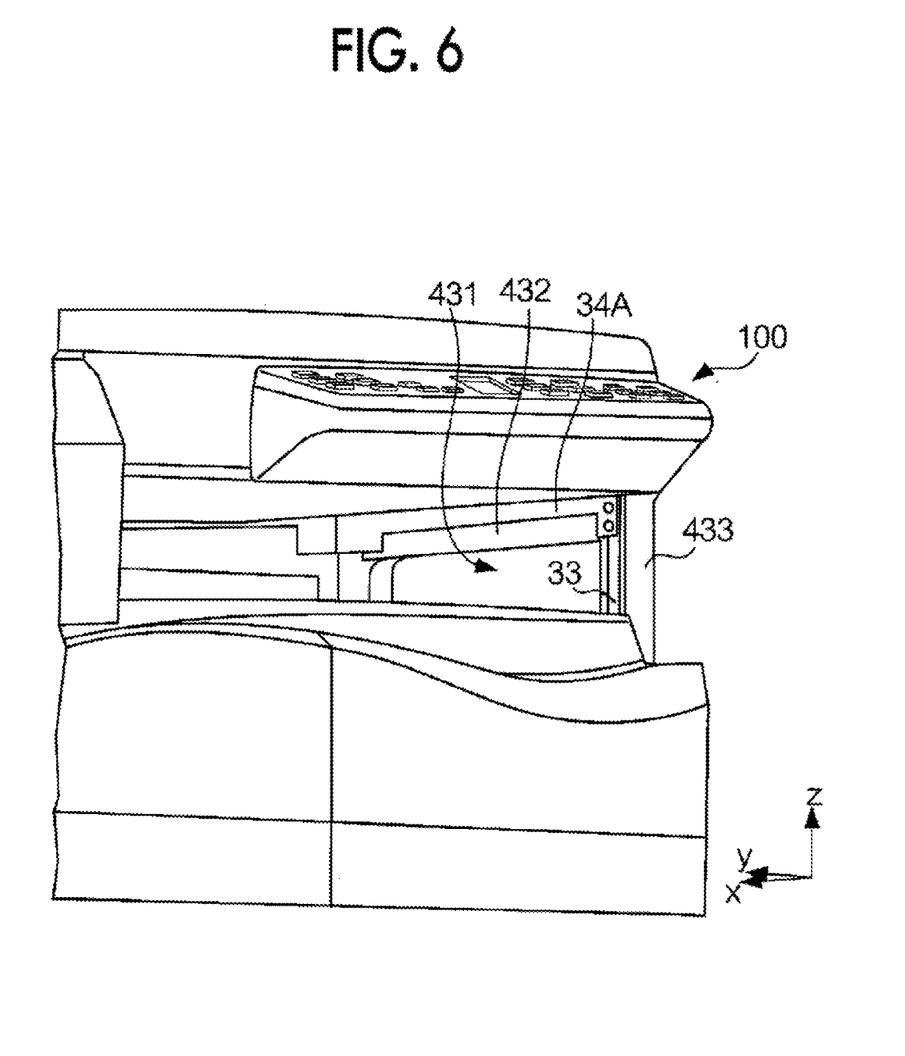
FIG. 6 is a rear view of an upper edge portion and a left edge portion of an opening portion.

FIG. 6 is a rear view of the upper edge portion 432 and the left edge portion 433 of the opening portion 431 (seen from a surface facing the image forming unit 2). As illustrated in the figure, the upper edge portion 432 of the opening portion 431 is disposed so as to extend along the beam portion 34A of the frame 3. The upper edge portion 432 is supported from the rear surface and reinforced by the beam portion 34A. Moreover, the left edge portion 433 of the opening portion 431 is disposed so as to extend along the columnar support 33 of the frame 3. The left edge portion 433 is supported from the rear surface and reinforced by the columnar support 33.

The upper edqe portion 432 of the opening portion 431 is used as a handle (grasping portion) when lifting the image forming apparatus 100. The user may lift the right side surface of the image forming apparatus 100 by inserting fingers into the opening portion 431 and pushing upward the upper edge portion 432 of the opening portion 431 with the pads of the fingers. As described above, since the upper edge portion 432 of the opening portion 431 is supported and reinforced by the beam portion 34A, the strength as a handle is secured.

Figure 7:
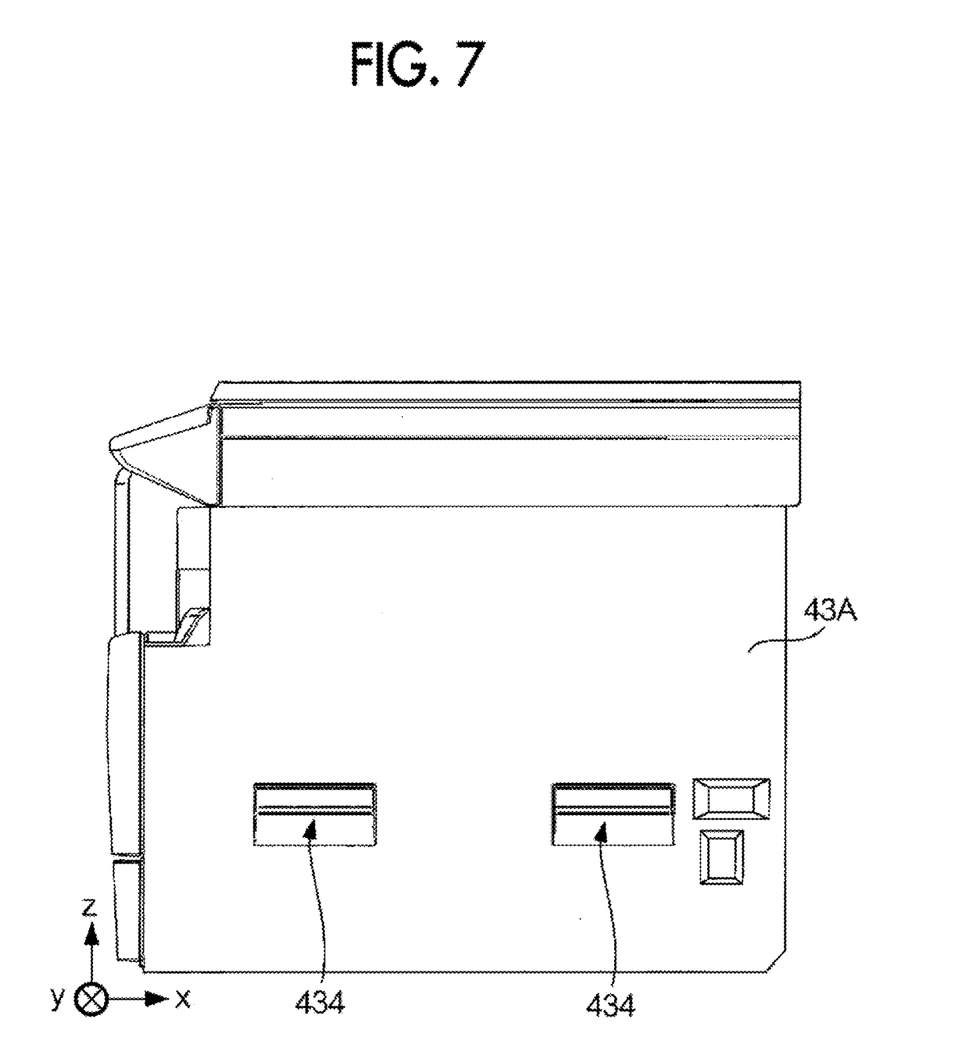
FIG. 7 is a front view of a right side cover.

The upper edge portion 432 of the opening portion 431 according to the present exemplary embodiment may have a concave shape as illustrated in FIG. 7 as a handle of the related art. FIG. 7 is a diagram illustrating a right side cover 43A that employs a handle 434 having the concave shape (that is not a penetration hole but a depression) of the related art instead of the opening portion 431. In the example illustrated in the figure, an external appearance quality deteriorates since an indented surface is formed on the side surface of the image forming apparatus. Moreover, if the depth of the concave portion is decreased from the perspective of the external appearance quality, the fingers of the user are likely to slip off from the concave portion and operating properties deteriorate.

In contrast, in the image forming apparatus 100 according to the present exemplary embodiment, since the opening portion 431 is employed as the handle rather than employing the concave portion of the related art, deterioration of the external appearance quality is suppressed. Moreover, in the image forming apparatus 100 according to the present exemplary embodiment, since the handle is configured as an opening rather than a concave portion, the space in which the fingers of the user are inserted is relatively large, and deterioration of the operating properties as the handle is suppressed.

Moreover, in the image forming apparatus 100 according to the present exemplary embodiment, since the opening portion 431 is formed in the right side cover 43, the volume of the cover decreases. Thus, the component cost of the right side cover 43 decreases as compared to an example where a concave portion is formed as a handle or an example where an additional portion is formed as a handle as in the related art. Further, in the image forming apparatus 100 according to the present exemplary embodiment, since the opening portion 431 is formed in the right side cover 43, the upper portion of the document discharge surface 26 is visible from the right side surface of the image forming apparatus 100. Furthermore, since light may enter through the opening portion 431, the visibility of an object on the document discharge surface 26 is improved.

(2) Second Exemplary Embodiment

In the first exemplary embodiment, the upper edge portion 432 of the opening portion 431 is supported and reinforced by the beam portion 34A. However, a rib may be disposed on the rear surface of the upper edge portion 432 of the opening portion 431 rather than supporting and reinforcing the upper edge portion 432 by the beam portion 34A to thereby secure the strength of the opening portion 431 as a handle. Such an exemplary embodiment will be described later.

The configuration of an image forming apparatus 100A according to the present exemplary embodiment is the same as that of the image forming apparatus 100 according to the first exemplary embodiment, except for the frame and the right side cover. More specifically, the configuration of the image forming apparatus 100A is the same as that of the image forming apparatus 100 according to the first embodiment except for the configuration on the right side surface of the frame and the configuration of the rear surface of the right side cover. Thus, the description of the configurations other than the configuration of the right side surface of the frame and the configuration of the rear surface of the right side cover will not be provided.

Figure 8:
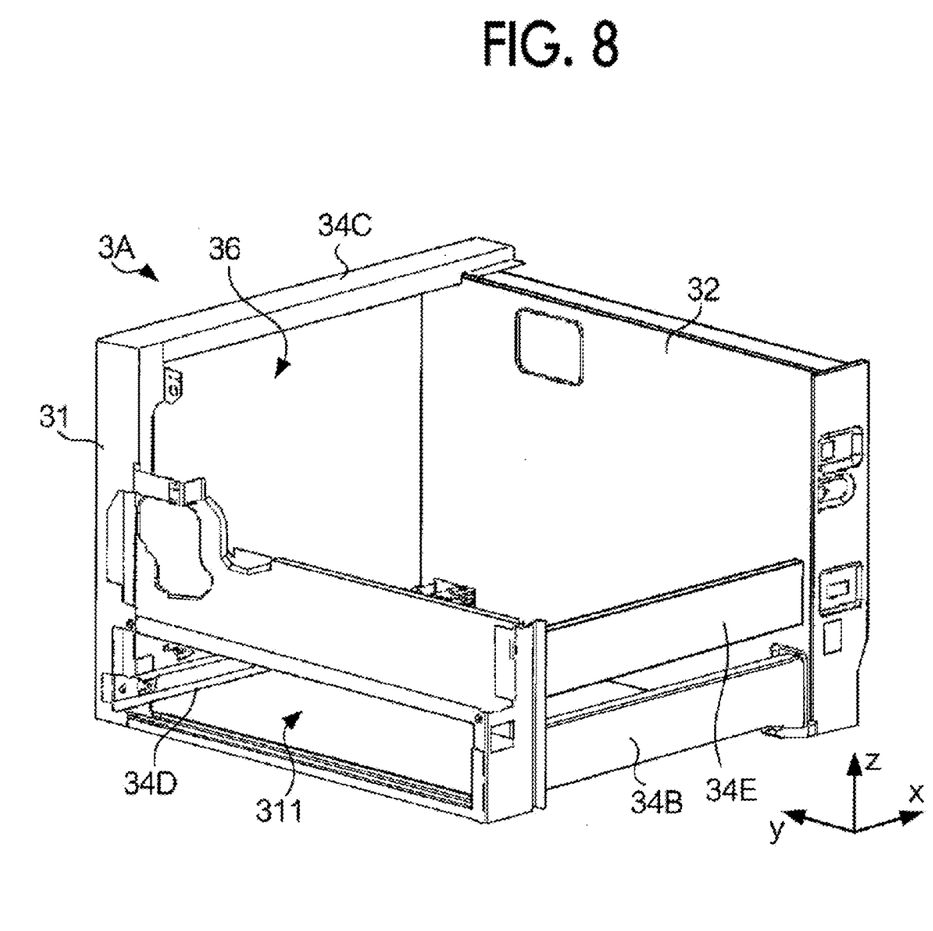
FIG. 8 is a perspective view of a frame according to a second exemplary embodiment.
Figure 9:
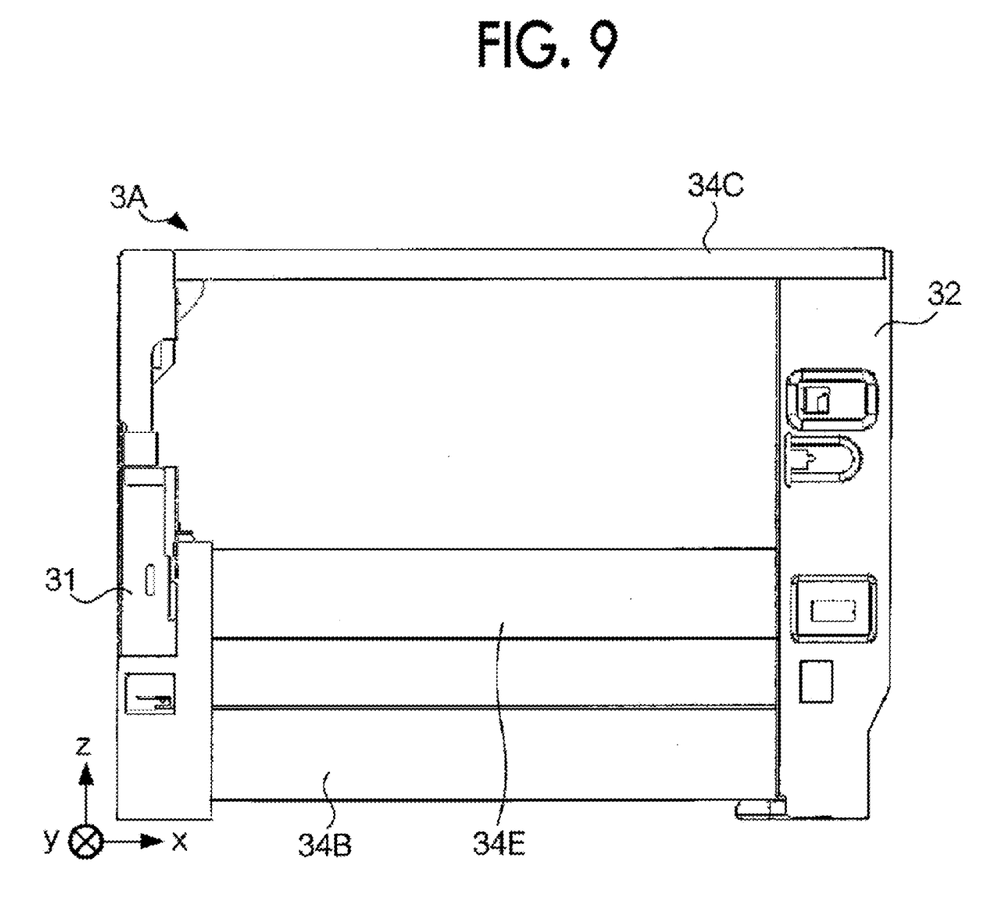
FIG. 9 is a right side view of the frame.

FIG. 8 is a perspective view of a frame 3A according to the present exemplary embodiment. FIG. 9 is a right side view of the frame 3A (seen from a positive y-side surface). In the frame 3A according to the present exemplary embodiment, the columnar support 33 and the beam portion 34A are not provided unlike the frame 3 of the first exemplary embodiment. Instead, a beam portion 34E is provided. The beam portion 34E is a square pillar member that is formed by bending a planar member, for example, similarly to the beam portions 34B, 34C, and 34D. The beam portion 34E is disposed so as to cover the right side surface (a negative y-side surface) of the image forming unit 2 and is fixed to the rear frame 32 and the front frame 31 by screwing, for example. The beam portion 34E connects the front frame 31 and the rear frame 32.

Figure 10:
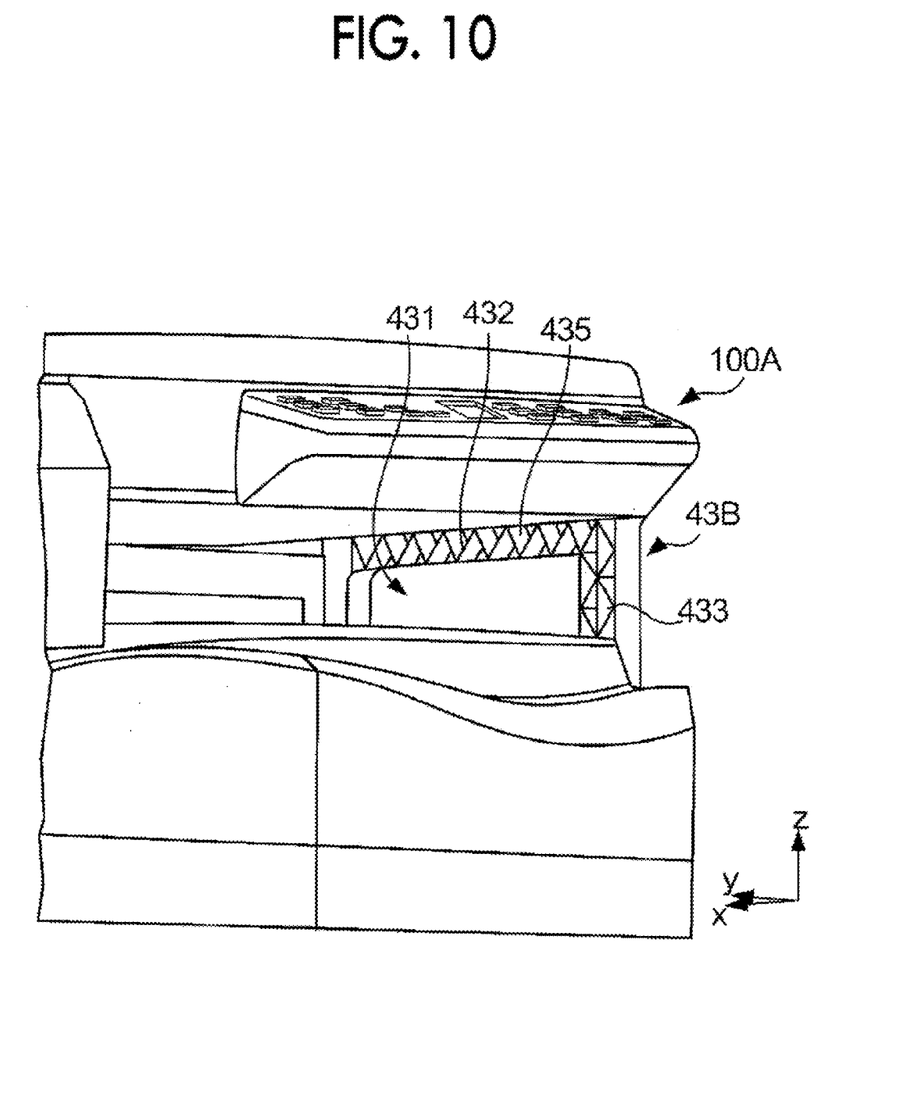
FIG. 10 is a rear view of an upper edge portion and a left edge portion of an opening portion.

FIG. 10 is a rear view of the upper edge portion 432 and the left edge portion 433 of the opening portion 431 of a right side cover 43B according to the present exemplary embodiment (seen from a surface facing the image forming unit 2). As illustrated in the figure, in the present exemplary embodiment, since the columnar support 33 and the beam portion 34A are not provided, the upper edge portion 432 of the opening portion 431 supports upward the image reading unit 1. Moreover, a rib 435 is disposed on the rear surfaces of the upper edge portion 432 and the left edge portion 433 of the opening portion 431 so as to form a trussed structure. Here, the trussed structure is a structural form that uses a triangle as its basic unit. The rib 435 is formed by molding a planar resin member into a triangular wave form, for example. In the opening portion 431 according to the present exemplary embodiment, since the rib 435 is disposed on the rear surface of the upper edge portion 432 so as to form a trussed structure, the upper edge portion 432 is reinforced, and the strength as a handle is secured.

(3) Modification Examples

The above exemplary embodiments may be modified in the following manner. Moreover, the following modification examples may be combined with each other.

(3-1) First Modification Example

In the first exemplary embodiment above, the length (length in the x-direction) of the opening portion 431 along the beam portion 34A of the right side cover 43 may be set to be equal to or greater than the width of a recording medium discharged by the image forming unit 2. Here, the width of the recording medium means the length of a shorter side of the sides of the recording medium. According to this configuration, the user may take out the recording medium from the document discharge surface 26 through the opening portion 431 without bending the recording medium. The length of the opening portion 431 along the beam portion 34A may be set to be equal to or greater than the largest width of the recording medium discharged by the image forming unit 2. Moreover, the length in the x-direction of the opening portion 431 of the right side cover 43B according to the second exemplary embodiment may be set to be equal to or greater than the width of the recording medium discharged by the image forming unit 2 similarly to the first exemplary embodiment.

(3-2) Second Modification Example

The configuration of the frame 3 or 3A according to the exemplary embodiment above is not limited to the configuration described above. For example, the shape of the front frame 31 and the rear frame 32 is not limited to the L-shape or the rectangular shape but may be other polygonal shapes. Moreover, the number of beam portions 34 may be five or more or 3 or less. Further, the shape of the beam portion 34 is not limited to the square pillar shape but may be other polygonal pillar shapes or circular pillar shapes. Furthermore, the number of columnar supports 33 in the first exemplary embodiment may be two or more.

(3-3) Third Modification Example

The configuration of the cover 4 according to the exemplary embodiments above is not limited to the configuration described above. For example, the shape of the front cover 41 and the rear cover 42 is not limited to the L-shape or the rectangular shape but may be other polygonal shapes. Moreover, the shape of the right side cover 43 or 43B and the left side cover 44 is not limited to the rectangular shape but may be other polygonal shapes. Further, the shape of the opening portion 431 is not limited to a rounded rectangular shape but may be an elliptical shape or other polygonal shapes. Furthermore, the structural form created by the rib 435 in the second exemplary embodiment is not limited to the trussed structure but may be other structural forms such as a honeycomb structure if the structural form may reinforce the strength of the upper edge portion 432 of the opening portion 431.

(3-4) Fourth Modification Example

The image forming apparatus 100 or 100A according to the exemplary embodiments above is not limited to a simple copying machine but may be a copying machine having a printer function and a facsimile function. Moreover, the image forming apparatus 100 or 100A may be a printer having a facsimile function.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image forming unit that forms an image on a recording medium;
    an image reading unit that is provided above the image forming unit so as to read an image of a document;
    a frame that accommodates the image forming unit therein, including a pair of front and rear planar members disposed along a front and rear of the image forming apparatus so as to face each other and a beam portion disposed along a side of the image forming apparatus that connects the pair of planar members and supports upward the image reading unit, the front planar member provided with a first opening portion in which a paper discharge surface is disposed; and
    a cover that covers at least a portion of the frame, provided with a second opening portion of which an upper edge portion is supported by the beam portion.

2. The image forming apparatus according to claim 1, wherein
    the image forming unit includes a discharge surface on an upper surface thereof, to which a recording medium having an image formed thereon is discharged, and
    the opening portion connects a space surrounded by the image forming unit and the image reading unit and an external space of the image forming apparatus.

3. The image forming apparatus according to claim 2, wherein
    the upper edge portion of the opening portion is disposed above the discharge surface.

4. The image forming apparatus according to claim 2, wherein
    a length of the opening portion along the beam portion is equal to or greater than a width of a recording medium discharged by the image forming unit.

5. The image forming apparatus according to claim 3, wherein
    a length of the opening portion along the beam portion is equal to or greater than a width of a recording medium discharged by the image forming unit.

6. The image forming apparatus according to claim 1, wherein
    the upper edge portion of the opening portion is a grasping portion.

7. The image forming apparatus according to claim 2, wherein
    the upper edge portion of the opening portion is a grasping portion.

8. The image forming apparatus according to claim 3, wherein
    the upper edge portion of the opening portion is a grasping portion.

9. The image forming apparatus according to claim 4, wherein
    the upper edge portion of the opening portion is a grasping portion.

10. The image forming apparatus according to claim 5, wherein
    the upper edge portion of the opening portion is a grasping portion.

11. An image forming apparatus comprising:
    an image forming unit that forms an image on a recording medium;
    an image reading unit that is provided above the image forming unit so as to read an image of a document;
    a frame that accommodates the image forming unit therein; and
    a cover that covers at least a portion of the frame, provided with a first opening portion on a front side of the image forming apparatus in which a paper discharge surface is disposed, and a second opening on a side of the image forming apparatus, the second opening having an upper edge portion reinforced by a rib and which supports upward the image reading unit.

* * * * *